US010005686B2

(12) United States Patent
Powell et al.

(10) Patent No.: US 10,005,686 B2
(45) Date of Patent: Jun. 26, 2018

(54) FLUID TREATMENT SYSTEM

(71) Applicants: Anthony L. Powell, London (CA); Brian E. Butters, London (CA)

(72) Inventors: Anthony L. Powell, London (CA); Brian E. Butters, London (CA)

(73) Assignee: 1934612 Ontario Inc., London, Ontario (CA)

( * ) Notice: Subject to any disclaimer, the term of this patent is extended or adjusted under 35 U.S.C. 154(b) by 163 days.

(21) Appl. No.: 14/070,263

(22) Filed: Nov. 1, 2013

(65) Prior Publication Data

US 2015/0122740 A1 May 7, 2015

(51) Int. Cl.
| | | |
|---|---|---|
| *B01D 61/00* | (2006.01) | |
| *B01D 63/00* | (2006.01) | |
| *B01D 21/01* | (2006.01) | |
| *C02F 1/52* | (2006.01) | |
| *B03D 3/00* | (2006.01) | |

(Continued)

(52) U.S. Cl.
CPC ............ *C02F 9/00* (2013.01); *B01D 19/0005* (2013.01); *B01D 36/00* (2013.01); *B01D 61/14* (2013.01); *C02F 1/5281* (2013.01); *B01D 2311/25* (2013.01); *B01D 2311/263* (2013.01); *C02F 1/20* (2013.01); *C02F 1/442* (2013.01); *C02F 1/444* (2013.01); *C02F 1/5245* (2013.01); *C02F 1/66* (2013.01); *C02F 1/74* (2013.01);

(Continued)

(58) Field of Classification Search
CPC ...... Y02W 10/15; C02F 1/52; C02F 2101/10; C02F 1/5281; C02F 1/001; C02F 1/5236; B01D 21/0012; B01D 21/00; B01F 5/0606

See application file for complete search history.

(56) References Cited

U.S. PATENT DOCUMENTS 4,478,766 A * 10/1984 Horikita .............. B01F 3/04262
210/221.2
4,639,314 A * 1/1987 Tyer .................... B01F 3/04262
210/220

(Continued)

FOREIGN PATENT DOCUMENTS

| CA | 1 149 374 | * | 7/1983 |
| JP | 2011056411 A | | 3/2011 |

OTHER PUBLICATIONS

International Search Report and Written Opinion dated Jun. 19, 2015 for International Patent Application No. PCT/IB2014/003005.

(Continued)

*Primary Examiner* — Ana Fortuna

(74) *Attorney, Agent, or Firm* — Baker & McKenzie LLP

(57) ABSTRACT

The present disclosure relates, according to some embodiments, to systems and methods of fluid treatment systems. Fluid treatment systems and methods thereof may be operable to remove contaminants and optionally reduce hardness. A fluid treatment system may comprise a feed stream configured to provide a contaminated fluid, a concentrate tank configured to receive the contaminated fluid from the feed stream, a filtration unit configured to receive the contaminated fluid from the concentrate tank, and a permeate stream operable to receive a treated fluid from the filtration unit. A concentrate tank may be operable to reduce hardness of the contaminated fluid. A filtration unit may be operable to filter contaminants from the contaminated fluid.

35 Claims, 3 Drawing Sheets

(51) Int. Cl.
*B01D 33/70* (2006.01)
*C02F 9/00* (2006.01)
*B01D 19/00* (2006.01)
*B01D 36/00* (2006.01)
*B01D 61/14* (2006.01)
*C02F 1/20* (2006.01)
*C02F 5/02* (2006.01)
*C02F 1/44* (2006.01)
*C02F 1/74* (2006.01)
*C02F 1/66* (2006.01)
*C02F 5/06* (2006.01)

(52) U.S. Cl.
CPC ...... *C02F 5/02* (2013.01); *C02F 5/06* (2013.01); *C02F 2301/043* (2013.01); *C02F 2301/046* (2013.01)

(56) References Cited

U.S. PATENT DOCUMENTS

| | | | | |
|---|---|---|---|---|
| 4,670,150 | A * | 6/1987 | Hsiung | B01D 61/147 210/636 |
| 5,462,674 | A * | 10/1995 | Butters | C02F 1/325 210/321.69 |
| 5,558,744 | A * | 9/1996 | Rock | B29C 66/4722 156/267 |
| 5,589,078 | A * | 12/1996 | Butters | B01D 39/02 210/104 |
| 6,464,877 | B1 * | 10/2002 | Mori | B01D 61/04 210/639 |
| 7,588,688 | B2 * | 9/2009 | Butters | C02F 1/44 210/195.2 |
| 8,097,163 | B1 * | 1/2012 | Stewart | B01D 61/025 210/408 |
| 8,147,697 | B2 * | 4/2012 | Al-Jlil | B01D 61/364 202/200 |
| 8,491,788 | B2 * | 7/2013 | McLeod | B01D 61/145 210/205 |
| 2005/0133456 | A1 * | 6/2005 | Beretta, III | C02F 1/74 210/739 |
| 2008/0135478 | A1 | 6/2008 | Zuback et al. | |
| 2009/0204419 | A1 | 8/2009 | Stewart | |
| 2012/0193296 | A1 * | 8/2012 | Bhaduri | C02F 1/5236 210/724 |
| 2013/0032544 | A1 * | 2/2013 | Drizo | C02F 1/58 210/669 |

OTHER PUBLICATIONS

Extended European Search Report dated Jul. 13, 2017 in connection with European Application No. 14857621.8, 9 pages.
Examination Report No. 1 dated Feb. 16, 2018 in connection with Australian Patent Application No. 2014343377, 4 pages.

* cited by examiner

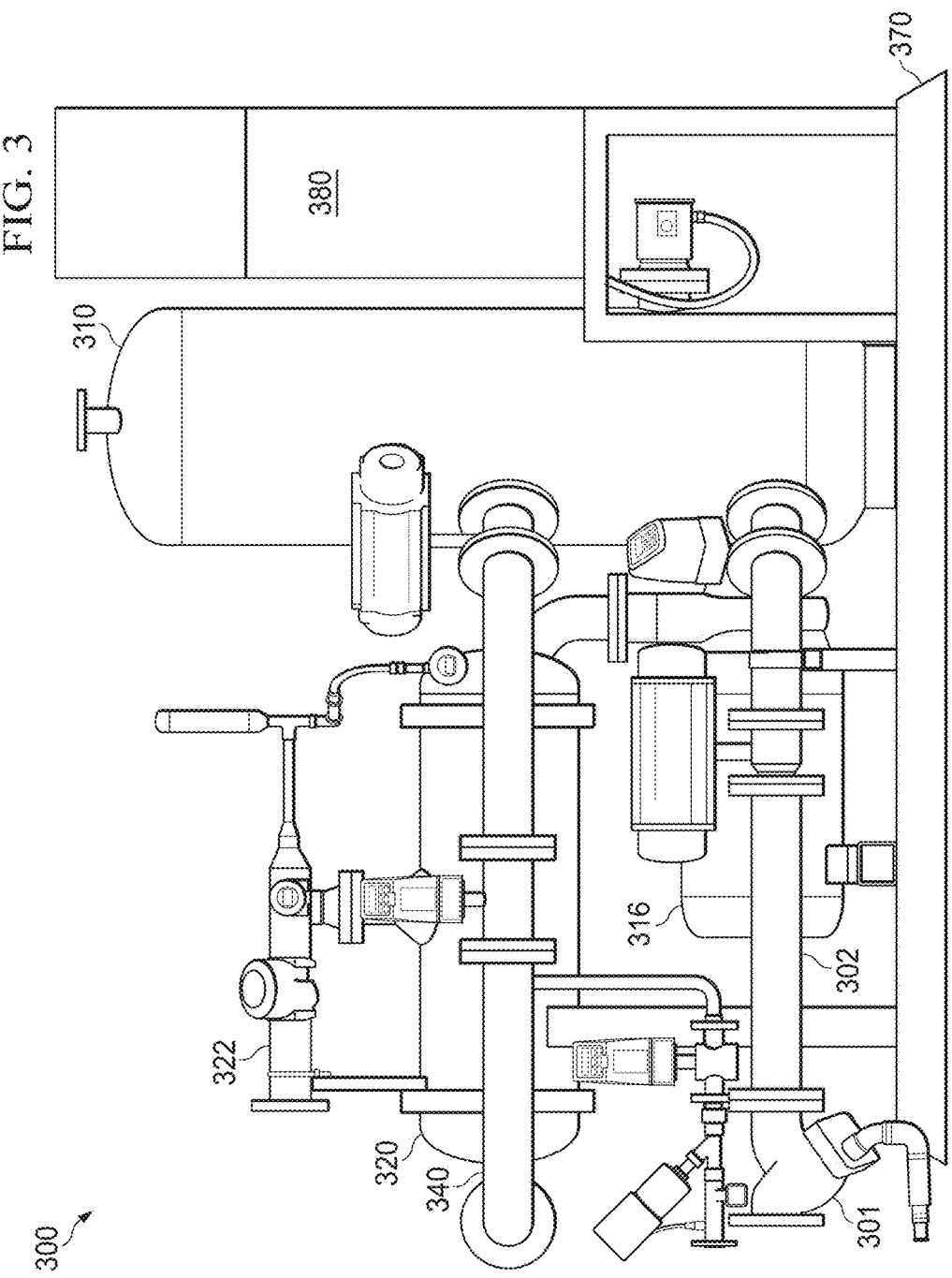

FLUID TREATMENT SYSTEM

FIELD OF THE DISCLOSURE

The present disclosure relates, in some embodiments, to fluid treatment systems. More specifically, the present disclosure relates, in some embodiments, to fluid treatment systems suitable for hardness reduction and contaminant removal.

BACKGROUND OF THE DISCLOSURE

Fluids such as water may comprise various contaminants including, for example, dissolved organic carbon, metals, and metals that contribute to water hardness. Water hardness may refer to the presence of metals such as calcium or magnesium. Such metals and their corresponding ions may interfere with the action of soaps, may lead to build up of lime scale, and may, through galvanic corrosion, lead to fouling of containment units or plumbing.

Contaminant removal and hardness reduction may be accomplished in various ways. Methods such as ion exchange, reverse osmosis, and lime softening, however, may require large facilities, large treatment units, high chemical requirements, and/or high cleaning requirements.

SUMMARY

Accordingly, a need has arisen for improved fluid treatment systems and methods thereof that may allow for smaller facilities, smaller treatment units, lower chemical requirements, and/or lower cleaning or clean-up requirements.

The present disclosure relates, according to some embodiments, to fluid treatment systems. Fluid treatment systems and methods thereof may be operable to remove contaminants and/or reduce hardness. A fluid treatment system may comprise a feed stream configured to provide a contaminated fluid, a concentrate tank (e.g., a high solids contact reactor) configured to receive the contaminated fluid from the feed stream, a filtration unit configured to receive the contaminated fluid from the concentrate tank, and an exit stream operable to receive a treated fluid from the filtration unit. A system may be operable to reduce hardness of the contaminated fluid (e.g., in a concentrate tank). A filtration unit may be operable to filter contaminants from the contaminated fluid. A system may comprise, in some embodiments, a chemical inlet configured to admit a coagulant, a base and/or other chemicals to permit and/or promote metal oxidation, reduction, chemical precipitation, chemical coagulation, or combinations thereof. A system may comprise a concentrate tank and a filtration unit in a single, contiguous, integrated unit with synergistically enhanced performance.

In some embodiments, a filtration unit may comprise a ceramic membrane system. In some embodiments, reducing the hardness of a contaminated fluid may comprise precipitating metals from a contaminated fluid. Metals may comprise calcium and magnesium.

In some embodiments, fluid treatment systems may further comprise an aeration unit upstream of a concentrate tank. An aeration unit may be operable to remove $CO_2$ content from a contaminated fluid. An aeration unit may comprise a dissolved oxygen addition device. An aeration unit or a dissolved oxygen addition device may be operable to receive compressed air from a compressed air inlet. A compressed air inlet may be connected to a permeate side of the dissolved oxygen addition device. An aeration unit or a dissolved oxygen addition device may comprises a substrate having pores less than 1 micron in diameter.

In some embodiments, fluid treatment systems may further comprise a chemical inlet upstream of the concentrate tank. A chemical inlet may be configured to provide at least one coagulant to a contaminated fluid. A coagulant may promote coagulation of contaminants in the contaminated fluid. For example, a coagulant may remove turbidity and DOC. At least one coagulant may be selected from alum (aluminum sulfate), ferric chloride or ferric sulfate, polyaluminum chloride (PAC) and aluminochloro hydrate (ACH), and combinations thereof.

In some embodiments, fluid treatment systems may further comprise a pump. A pump may be disposed between a reactor (e.g., concentrate tank) and a filtration unit. A pump may be configured to regulate flow of a contaminated fluid from a reactor to a filtration unit.

In some embodiments, fluid treatment systems may further comprise a recycle stream. A recycle stream may be configured to receive a recycle fluid from a filtration unit and to provide a recycle fluid to a reactor. In some embodiments, fluid treatment systems may further comprise a recycle valve, wherein a recycle valve may be disposed on a recycle stream and may be configured to control flow of a recycle fluid from a filtration unit to a reactor. In some embodiments, fluid treatment systems may further comprise a discharge stream disposed on a recycle stream, wherein a discharge stream may be configured to discharge at least a portion of a recycle fluid from a recycle stream. In some embodiments, fluid treatment systems may further comprise a discharge valve, wherein a discharge valve may be disposed on the discharge stream and may be configured to control flow of a discharge stream.

In some embodiments, a concentrate tank may comprise an 100 gal/tank. A concentrate tank may comprise a 6 ft diameter. A concentrate tank may comprise a retention rate of about 1 minute.

The present disclosure relates, according to some embodiments, to methods of fluid treatment, methods of hardness reduction and contamination removal, and methods of operating fluid treatment systems. In some embodiments, methods may comprise providing from a feed stream a contaminated fluid, receiving a contaminated fluid at a concentrate tank, receiving at a filtration unit a contaminated fluid from a concentrate tank, and receiving at an exit stream a treated fluid from a filtration unit. A concentrate tank may be configured to reduce the hardness of a contaminated fluid. A filtration unit may be configured to filter contaminants from a contaminated fluid.

In some embodiments, a filtration unit may comprise a ceramic membrane system. In some embodiments, reducing the hardness of a contaminated fluid may comprise precipitating metals from a contaminated fluid. Metals may comprise calcium and magnesium.

In some embodiments, methods comprise an aeration unit upstream of a concentrate tank. An aeration unit may be operable to remove $CO_2$ content from a contaminated fluid using a aeration unit. An aeration unit may comprise a dissolved oxygen addition device. In some embodiments, methods may comprise receiving at a dissolved oxygen addition device compressed air from a compressed air inlet. Methods may comprise connecting a compressed air inlet to a permeate side of a dissolved oxygen addition device.

In some embodiments, a dissolved oxygen addition device comprise a substrate having pores less than 1 micron in diameter. In some embodiments, methods may comprise passing compressed gas or compressed air through the substrate, forming sub-micron sized bubbles on a wet side of the substrate, and scrubbing the sub-micron sized bubbles at a flow rate of about 4 l/min sufficient to remove the bubble before the bubble expands.

In some embodiments, methods may comprise providing a chemical inlet upstream of a concentrate tank, and providing at least one coagulant and/or base to a contaminated fluid through a chemical inlet, wherein a coagulant promotes coagulation of contaminants in a contaminated fluid. At least one coagulant may be selected from the group consisting of alum (aluminum sulfate), ferric chloride or ferric sulfate, polyaluminum chloride (PAC) and aluminochloro hydrate (ACH), and combinations thereof.

In some embodiments, methods may comprise providing a pump between a concentrate tank and a filtration unit, and regulating a flow of a contaminated fluid from a concentrate tank to a filtration unit using a pump.

In some embodiments, methods may comprise providing a recycle stream, receiving in the recycle stream a recycle fluid from the filtration unit, and providing the recycle fluid in the recycle stream to the concentrate tank. Methods may comprise providing a recycle valve on a recycle stream, and regulating a flow of a recycle fluid from a filtration unit to a concentrate tank using a recycle valve. Methods may comprise providing a discharge stream on a recycle stream, and discharging at least a portion of a recycle fluid from a recycle stream through a discharge stream. Methods may comprise providing a discharge valve on a discharge stream, and regulating a flow of a discharge stream using a discharge valve.

BRIEF DESCRIPTION OF THE DRAWINGS

Some embodiments of the disclosure may be understood by referring, in part, to the present disclosure and the accompanying drawings, wherein:

FIG. 3 illustrates a fluid treatment system according to a specific example embodiment of the disclosure.

DETAILED DESCRIPTION

Figure 1:
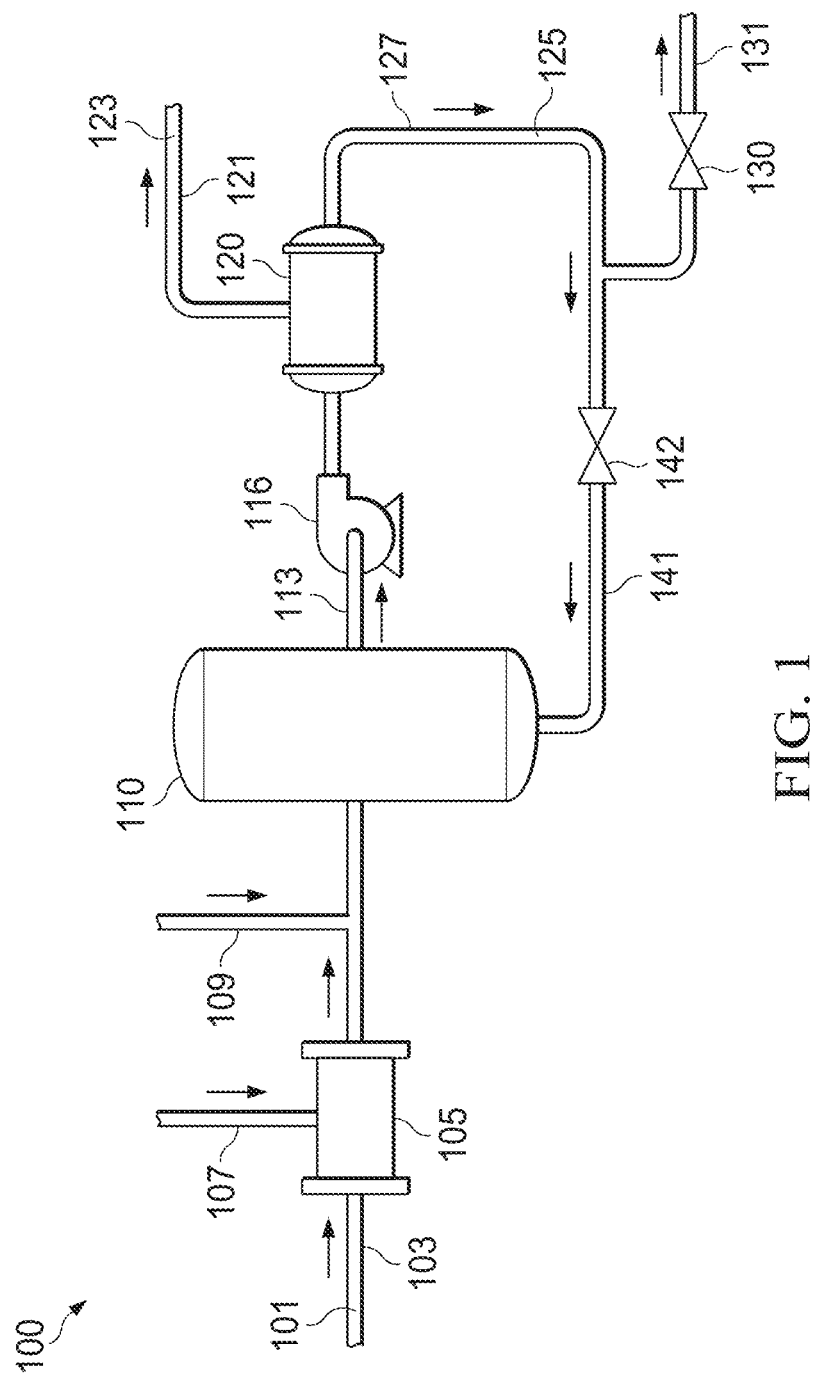
FIG. 1 illustrates a fluid treatment system according to a specific example embodiment of the disclosure.

Ion exchange water softening systems may merely substitute calcium or magnesium (divalent cations) with sodium (Na—monovalent cation). Drawbacks of existing ion exchange (IX) technology is that the IX resin may require frequent backflushing of either salt (NaCl) or sodium hydroxide (NaOH) which generates a waste brine solution, and IX increases sodium concentrations in the treated water proportionally with hardness levels. It may be desirable to avoid elevated sodium levels in water intended for human or animal use since sodium has been linked with hypertension and heart disease.

Reverse Osmosis (RO) may be effective in filtering the calcium and magnesium, however, a key drawback may be fouling due to hardness—calcium readily plugs RO membranes. Thus RO membranes commonly require chemical conditioning and high cleaning requirements. Another key drawback is the high brine waste generated (20%-25% of flow) that requires further processing or disposal.

Lime softening uses the addition of lime ($Ca(OH)_2$) and sometime soda ash as well to precipitate Ca to $CaCO_3$ and magnesium to $MgCO_3$ via the following reactions.

$$CO_2 + Ca(OH)_2 \rightarrow CaCO_3 + H_2O \quad\quad 1)$$

$$Ca(HCO_3)_2 + Ca(OH)_2 \rightarrow 2CaCO_3 + 2H_2O \quad\quad 2)$$

$$Mg(HCO_3)_2 + Ca(OH)_2 \rightarrow CaCO_3 + MgCO_3 + 2H_2O \quad\quad 3)$$

Depending upon the levels of Ca and Mg, the pH after lime softening is between 10.3 (for low Mg applications)-11.0 (for high Mg applications). This means that after the hardness sludge is removed (e.g., through a clarifier or filtration method), additional chemical addition is required for pH neutralization. Although $CO_2$ does not add to hardness it quickly reacts with lime thus increasing the required dosage. These reactions are followed by settling and filtration.

Other types of water contaminants typically treated in potable water include metals such as iron and manganese, and dissolved organic carbon (DOC). DOC leads to TTHMs and HAAs after chlorination (secondary disinfection). Metals removal requires a reaction tank or vessel for chemical precipitation and/or oxidation in order to solidify the metals such that they can be removed via a clarifier and or filter. Similarly, in coagulation processes a large tank or weir design is required to allow the contaminants to coagulate into larger macro solids so that they can drop out in a clarifier or be removed in a filter. In both processes, there is a 2 step process required 2 unit operations.

The present disclosure relates, in some embodiments, to articles, systems, and methods of use for fluid treatment systems. More specifically, the present disclosure relates, in some embodiments, to fluid treatment systems operable to remove contaminants from a contaminated fluid. The present disclosure relates, according to some embodiments, to a method for decontaminating water comprising forming a contaminant solid in a reactor (e.g., a high solids contact reactor) and separating a contaminant solid from water in a filter unit, which together provide synergistic enhancement of contaminant removal. Forming a contaminant solid may comprise coagulation, precipitation, oxidation, reduction or combinations thereof.

Some embodiments of the present disclosure may relate to fluid treatment systems for hardness reduction and/or contaminant removal. For example, a system may include microfiltration unit or an ultrafiltration unit configured to both precipitate hardness and filter precipitate. In some embodiments, fluid treatment systems may comprise a feed stream operable to provide a contaminated fluid. A contaminated fluid may comprise water or other fluids that may comprise dissolved organic carbons, and calcium, magnesium, other minerals or compounds that may form multivalent cations, or any combinations thereof.

According to some embodiments, a separate reactor vessel upstream of a filter may be obviated and/or excluded. Without limiting any particular embodiment to a specific mechanism of action, a precipitation reactor may be excluded because hardness precipitation reactions occur in the ceramic membrane system (e.g., CUF), not in a separate reactor vessel upstream of the filter. In some embodiments, since $CO_2$ is stripped from feedwater before it reaches the filtration unit and since the hardness precipitation reaction occurs inside the filtration unit, the accumulation of precipitated calcium and/or magnesium carbonates in the filtration system regulate the pH in the filtration unit at levels to promote hardness precipitation reactions. According to some embodiments, such a configuration allows (a) substantially all of the lime and/or soluble hydroxide ions added upstream of the filtration system react directly with the hardness (e.g., they are not scavenged or used to increase pH, meaning reduced chemical dosages) and/or (b) the final pH of the softened water to be reduced over traditional lime softening approaches (e.g., because reduced chemical addition to the process). Post neutralization may not be required.

Feed Stream

In some embodiments, a feed stream may comprise a pipe or tube. A pipe or tube may comprise particular materials and may have a particular length or diameter. A feed stream may have a particular flow rate or a flow rate of a contaminated fluid therein. Dimensions and specifications such as particular materials, length and diameter of pipes, and flow rates may be varied without departing from the description herein.

Aeration Unit

In some embodiments, fluid treatment systems may further comprise an aeration unit. An aeration unit may be disposed upstream of a concentrate tank. An aeration unit may be in fluid communication with a feed stream. A fluid connection may be established through coupling or otherwise appropriately connecting an aeration unit to a feed stream. An aeration unit may be disposed along a feed stream, configured to receive a contaminated fluid therein and configured to provide a contaminated fluid therein to a concentrate tank. Various aeration units may be used without departing from the description herein. In some embodiments, an aeration unit may comprise a dissolved oxygen (DO) addition device.

An aeration device may advantageously allow contaminants in a contaminated fluid to be oxidized. In some embodiments, an aeration device may advantageously allow metals in a contaminated fluid to be oxidized. An aeration unit may comprise a compressed air inlet configured to provide compressed air to the contaminated fluid. A compressed air inlet may allow compressed air to contact the contaminated fluid at a steady metered rate. An addition of compressed air may allow $CO_2$ to be stripped from the contaminated fluid. In some fluid treatment systems, $CO_2$ may react with hydroxide-based precipitating agents or coagulants before hardness reacts with precipitating agents or coagulants. $CO_2$ reacting with precipitating agents or coagulants may thus prevent hardness from reacting with precipitating agents or coagulants. $CO_2$ reacting with precipitating agents increases the dosage of hydroxide-based precipitating agent and may also undesirably increase the pH of the contaminated fluid. Thus, removing $CO_2$ content prior to introducing precipitating agents or coagulants into the fluid treatment system may advantageously allow for higher reaction rate of hardness and precipitating agents or coagulants. Removing $CO_2$ content may also advantageously control the pH of the contaminated fluid in a fluid treatment system.

In some embodiments, an aeration unit may comprise a DO addition device. A DO addition device may oxidize the metals (e.g., iron) to create insoluble metal oxides. With DO addition device, a system may oxidize metals and remove hardness in one unit operation. In some embodiments an aeration unit may advantageously reduce chemical requirements for achieving a desired level of hardness reduction by removing dissolved $CO_2$ prior to adding hydroxide precipitating agents. In some embodiments, an aeration unit may not be necessary for a desired level of hardness reduction or contaminant removal. In some embodiments an aeration unit may advantageously reduce operating costs of a fluid treatment system.

In some embodiments, metals may be removed from a contaminated fluid by oxidizing metals into insoluble metal oxides. A compressed gas inlet may be coupled to, connected to, or otherwise in communication with a compressed gas source. A compressed gas source and a compressed gas inlet may be operable to provide compressed gas, and may, for example, provide compressed air or oxygen. A gas flow of a compressed gas inlet may be controlled by valves or mass flow controllers or other control devices.

In some embodiments, a cross-flow filtration device may be employed, and a compressed gas source may be connected to a permeate side (a dry side) of a DO addition device. A compressed gas may have a pressure great than the pressure of the contaminated fluid. Thus, when a compressed gas is introduced into a DO addition device, a compressed gas may push through a DO addition device, or more specifically, push through a substrate of a device. When a compressed gas pushes through a substrate of a DO addition device, bubbles may be created in the liquid media.

If both metals removal and hardness removal is desired or required, an aeration device may facilitate both, in some embodiments. It may oxidize metals into an insoluble metal oxide and reduce chemical requirements for hardness removal by stripping out $CO_2$ prior to adding hydroxide-based precipitating agents.

In some fluid treatment systems, large bubbles may be formed when compressed gas passes through a substrate. Large bubbles may have sufficient buoyancy to detach from a substrate. Thus, large bubbles may float to a top surface of a contaminated liquid media or a contaminated fluid. Floating of bubbles to a top surface may facilitate air stripping of contaminants present in a contaminated fluid.

According to embodiments of the present disclosure, passing a compressed gas across or through tiny holes or pores in a substrate of a DO addition device may generate bubbles on a side of the substrate where a fluid passes. Generated bubbles may be micro-bubbles or may be sub-micron in size. Sub-micron sized bubbles may have significantly less buoyancy than larger bubbles. Thus, generated bubbles may be small enough such that their buoyancy does not allow the bubbles to overcome a surface tension of the substrate. Thus, generated bubbles may not detach from the substrate and may not rise to the top of the contaminated fluid. Instead, generated bubbles may remain substantially adhered or proximate to a surface of the substrate. In some embodiments, only scrubbing of the passing contaminated fluid along a wet side of a substrate in a DO addition device may cause the bubbles to be released into a contaminated fluid.

According to embodiments of the present disclosure, generating sub-micron sized bubbles may substantially increase a contact area of oxygen within a DO addition device. Small bubbles may provide greater surface area-to-volume ratio as compared to larger bubbles using a same quantity or volume of gas. Employing the disclosed principles, therefor, may maximize the surface area-to-volume ratio of an air or oxygen gas introduced into a DO addition device. Stated another way, using a same volume of gas, a greater number of smaller bubbles may be generated than larger bubbles. Thus, generating smaller bubbles may increase the surface area of oxygen in a contaminated fluid. In turn, contact between oxygen and a contaminated fluid may be significantly increased without significantly increasing a volume of gas introduced.

In some embodiments, ratios of about 76 l/min of contaminated fluid per 30 l/min of pressurized gas may be achieved. In some embodiments, pure pressurized oxygen may be used. In embodiments where pure pressurized oxygen is used, ratios of about 76 l/min of contaminated media per nominally 6 l/min of pressurized oxygen may be achieved. According to the present disclosure, any type of filter unit may be used in place of a DO addition device without departing from the description herein. Appropriate filters may be operable to create bubbles, as defined herein, and to oxidize metal particles in a passing liquid media.

In some embodiments, an increased pressure of a compressed gas along with the fluid dynamics of a gas being forced through pores of a substrate and being scrubbed by a passing fluid, may produce high-turbulent mixing actions within a DO addition device. In some embodiments, a high Reynolds number in a turbulent range may be effective. A high Reynolds number may be achieved using a contaminated fluid flow rate of about 4 l/min through a 4 mm channel. A contaminated fluid may be released onto the permeate side of a cross-flow filtration unit employing ceramic membranes with openings that may be less than 1 micron in diameter.

A net effect of high-turbulent mixing and a maximized surface area-to-volume ratio of an introduced gas may be that a contaminated fluid can become saturated with dissolved oxygen with significantly less volume of gas needed. Furthermore, since a buoyance of bubbles may keep them from detaching from a substrate and thereby entering a fluid stream or rising to the top of a fluid stream, bubbles may only be removed by a passing liquid media scrubbing a wet side of a substrate. In some embodiments, oxygen provided by bubbles may be more evenly diffused throughout a contaminated fluid or a liquid media. Thus, efficiency of a fluid treatment process and a oxidization process may be increased.

In some embodiments, a contaminated fluid exiting a DO addition device may comprise insoluble metal particles. Insoluble metal particles may tend to floc as relatively large particles. In some embodiments, large particles such as insoluble metal particles may settle to a bottom of a settling tank. In some embodiments, large particles such as insoluble metal particles may be removed using any type of filtration system. Such methods of filtering insoluble metal particles may advantageously reduce or eliminate the need for aggressive chemicals. Other advantages may include reducing or eliminating the need to discharge compounds into a sewer system, dispose of chemicals at off-side disposal facilities. Furthermore, costs associated with such actions may be reduced or eliminated as well.

Coagulant

In some embodiments, a fluid treatment system may further comprise a chemical inlet. A chemical inlet may be disposed downstream of an aeration unit and/or upstream of a high solids contact reactor. A chemical inlet may be disposed upstream of a concentrate tank and/or may be operable to meter a selected coagulant or precipitating agent into a contaminated fluid. A coagulant may comprise, in some embodiments, one or more metal salts. A coagulant may destabilize charge on molecules (e.g., solid and dissolved) which causes contaminants to coagulate together into a solid. Once they are coagulated, they can be filtered. Contaminants that may be removed with coagulant may include, for example, dissolved organic carbon (DOC), color causing contaminants such as ligands, and turbidity.

Coagulation usually occurs in large, dedicated reaction vessels. Some embodiments of the present disclosure differ, however, in that coagulation is promoted in the concentrate tank via high solids mixing, obviating the need for a separate coagulation tank.

A coagulant may be selected based on the composition or other characteristics of a contaminated fluid. In some embodiments, use of more than one coagulant may be desirable. Appropriate coagulants may include alum (aluminum sulfate), ferric chloride or ferric sulfate, polyaluminum chloride (PAC) and aluminochloro hydrate (ACH), and combinations thereof. Other coagulants may be selected as needed to target particular contaminants in a contaminated fluid. Similarly, combinations of coagulants, in the same or differing proportions, may be selected to achieve a desired coagulating effect. Coagulants provided by the chemical inlet may be operable to promote and/or facilitate dissolved organic compounds removal.

Hydroxide Precipitating Agents

In some embodiments, fluid treatment methods may comprise addition of $Ca(OH)_2$ or lime. Lime addition may be achieved by direct addition of $Ca(OH)_2$. In some embodiments, $Ca(OH)_2$ may be introduced indirectly by the addition of a soluble hydroxide compound. A soluble hydroxide compound may include sodium hydroxide NaOH and/or potassium hydroxide KOH. Indirect addition of lime may occur under the following chemistry:

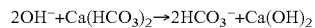

Whether $Ca(OH)_2$ is added directly or indirectly, the addition may promote precipitation of hardness in a contaminated fluid. Hardness precipitation, as promoted by $Ca(OH)_2$ may occur in a concentrate tank according to the present disclosure. Hardness precipitation may comprise calcium and magnesium precipitating into carbonate salts. Precipitated carbonated salts may build up in the concentrate loop of a fluid treatment system according to the present disclosure.

Concentrate Tank

In some embodiments, fluid treatment systems may further comprise a concentrate tank. A concentrate tank may be in fluid communication with a feed stream. Accordingly, a feed stream comprising a contaminated fluid may be operable to provide a contaminated fluid to a concentrate tank, and a concentrate tank may be operable to receive a contaminated fluid from a feed stream. In some embodiments, an aeration unit and/or a chemical inlet may be disposed upstream of a concentrate tank. In some embodiments, a concentrate tank may be in fluid communication with an aeration unit and/or a chemical inlet. Accordingly, a concentrate tank may receive a contaminated fluid downstream of an aeration unit and/or a chemical inlet.

A concentrate tank may have, in some embodiments, any desired size, shape, and orientation. For example, a concentrate tank may be generally cylindrical and be generally vertically positioned. In some embodiments, a concentrate tank may comprise a reactor tank. Dimensions and sizes of a concentrate tank may be varied to achieve various functional needs. In some embodiments, larger concentrate tanks may be operable to receive a greater volume of contaminated fluid. In some embodiments, smaller concentrate tanks may be more cost efficient. In some embodiments, a concentrate tank may comprise a volume of about 800 gallons. In some embodiments, a concentrate tank may comprise a diameter of about 6 feet. Different reactor designs or types may be selected depending on factors such as the characteristics or concentration of contaminants in a feed stream.

In some embodiments, a concentrate tank may employ cross-flow filtration or may exhibit cross-flow mechanics. In some embodiments, a concentrate tank may exhibit a retention time of about 30 seconds to about 5 minutes, depending upon the application. According to some embodiments, a high flow rate from cross flow filtration coupled with relatively high concentrations of precipitated and/or coagulated and/or oxidized contaminants creates a high solids contact reactor within the ultrafiltration device. This may promote and/or accelerate the reactions in the concentrate tank. A process may perform (e.g., may perform well) where there are accumulated solids in the tank (to promote further reaction). A blowdown (e.g., intermittent, continuous) may be performed to release some solids that accumulate in the system. When performed, at least some solids are allowed to remain in the system (e.g., in the tank). The amount of solids to be retained after blowdown may be selected (e.g., empirically) to be sufficient to nucleate further precipitation reactions at a desired rate.

In some embodiments, a concentrate tank may be operable to reduce hardness of the contaminated fluid. Hardness of water or fluid may occur when the water or fluid has a high calcium and/or magnesium content. A concentrate tank may reduce hardness by removing the multivalent cations that may result from a mineral content. In some embodiments, a concentrate tank may reduce hardness by precipitating the hardness or precipitating the multivalent cations from the water or fluid. Hardness precipitation may comprise calcium and magnesium precipitating into carbonate salts. Precipitated carbonated salts may build up in the concentrate loop of a fluid treatment system according to the present disclosure. In some embodiments, providing the proper chemistry and/or mixing may be key variables in precipitating calcium and magnesium.

Pump

In some embodiments, fluid treatment systems may further comprise a pump. A pump may be disposed between a concentrate tank and a filtration unit. A pump may be in fluid communication with an exit stream of a concentrate tank. A pump may be configured to regulate flow rate of a concentrated fluid from the concentrate tank to a filtration unit to create a desired cross flow through the filtration unit, and provide sufficient mixing in the concentrate tank.

Various types of pump may be used without departing from the description herein. In some embodiments, a pump may be a centrifugal pump, horizontal pump, or screw pump.

Filtration Unit

In some embodiments, fluid treatment systems may further comprise a filtration unit. A filtration unit may be in fluid communication with the concentrate tank. Accordingly, a filtration unit may be operable to receive a concentrated fluid from a concentrate tank, and a concentrate tank may be operable provide a concentrated fluid to a filtration unit. A pipe or tube may be used to establish a fluid communication between a concentrate tank and a filtration unit. A pipe or tube for establishing fluid communication may comprise particular materials and may have a particular length or diameter. Dimensions and materials used may be varied without departing from the description herein. In some embodiments, the size of the pipe may be dependent upon the desired cross flow rate to the ceramic membrane. The cross flow rate can range between 1 to 10 times of that of the flow rate of the permeate (depends upon, for example, the material that is being filtered).

In some embodiments, a filtration unit may be operable to filter contaminants from the contaminated fluid. Contaminants from contaminated fluid may include total suspended solids (TSS), pathogens, oxidized contaminants, coagulated contaminants, and precipitated contaminants. In some embodiments, contaminants in a water or fluid may include precipitates of multivalent cations that may contribute to hardness.

In some embodiments, a filtration unit may comprise a ceramic membrane filtration unit. In some embodiments, a ceramic membrane filtration unit may comprise an ultrafiltration membrane, nanofiltration membrane, or microfiltration membrane. Different membranes or types of ceramic membrane filtration units may be selected depending on the contaminants in a contaminated fluid. In some embodiments, ceramic membrane filtration units may comprise pore sizes between 1 nm to 900 nm. In some embodiments, ceramic membrane filtration units may comprise materials such as $\alpha$-$Al_2O_3$, $\gamma$-$Al_2O_3$, $TiO_2$, $ZrO_2$, or $SiO_2$. Other materials may be used without departing from the description herein.

A filtration unit may be configured to operate, in some embodiments, as a cross-flow filter. Cross flow operation may provide shearing at the membrane wall, which may help scrub the membrane and/or reduce fouling. A filtration unit may comprise, for example, a body having at least one channel extending through the body. A channel may comprise an inlet configured to admit fluid to the filtration unit, an outlet in fluid communication with the inlet and configured to allow flow-through fluid (e.g., concentrated media) to exit the filtration unit, and a membrane. At least a portion of a channel may be defined by a membrane having a contaminated media surface in fluid communication with the inlet and the outlet, and an opposite permeate surface. A filtration unit may further comprise a second outlet in fluid communication with a permeate surface and configured to allow treated fluid media (permeate) to exit the filtration unit. A filtration may include a first portion in fluid communication with an inlet and outlet and a second portion in fluid communication with a permeate outlet. Fluid communication between a first portion and a second portion may be mediated by a membrane interposed between the two. A first portion may be otherwise sealed from a second portion to reduce or prevent membrane bypass. A filtration unit may have any desired size, shape, or orientation. For example, a filtration unit may be generally cylindrical and positioned generally horizontally. Inlets may be positioned at one end and concentrate outlets at the opposite end. A permeate outlet may be positioned anywhere including, for example, extending from a side surface of the unit at or near its middle.

Permeate Stream

In some embodiments, fluid treatment systems may further comprise a permeate stream operable to receive treated fluid from a filtration unit. Treated fluid may be fluid wherein hardness may have been reduced and contaminants may have been removed. Treated fluid may be or may comprise permeate from a filtration unit. A permeate stream may comprise a pipe or tube in fluid communication with a filtration unit. A pipe or tube may comprise particular materials and may have a particular length or diameter as desired. A feed stream may have a particular flow rate or a flow rate of a contaminated fluid therein. Dimensions and specifications such as particular materials, length and diameter of pipes, and flow rates may be varied without departing from the description herein.

Recycle Loop

In some embodiments, fluid treatment systems may further comprise a recycle loop or a recycle stream. A recycle stream may be configured to receive a fluid from a filtration unit and provide a fluid to a concentrate tank. In some embodiments, a fluid provided to a concentrate tank by a recycle stream may comprise at least a portion of a fluid from a filtration unit. According to some embodiments, a recycle loop and/or a feed stream inlet may be in fluid communication with a generally upper portion of a concentrate tank and/or generally opposite of a concentrate tank outlet (e.g., an outlet in fluid communication with a filtration unit).

Recycle Valve

In some embodiments, fluid treatment systems may further comprise a recycle valve. A recycle valve may be disposed on a recycle stream and/or configured to provide pressure (e.g., a prescribed or desired pressure) and/or cross flow rate in a filtration unit. Various types of valves may be used without departing from the description herein. In some embodiments, a recycle valve may be a ball valve, butterfly valve, plug valve, needle valve, pinch valve, gate valve, annular valve, diaphragm valve, or other suitable valve.

Discharge Stream

In some embodiments, fluid treatment systems may further comprise a discharge stream. A discharge stream may be disposed on the recycle stream and/or configured to allow removal of at least some solids from the system. A discharge stream may be configured to receive at least a portion of a fluid in a recycle stream. A fluid received may comprise a substantial concentration of precipitated hardness and/or contaminants removed from a contaminated fluid as provided by a feed stream.

A discharge stream may comprise a pipe or tube in fluid communication with a recycle stream. A pipe or tube may comprise particular materials and may have a particular length or diameter. A feed stream may have a particular flow rate or a flow rate of a contaminated fluid therein. Dimensions and specifications such as particular materials, length and diameter of pipes, and flow rates may be varied without departing from the description herein.

Discharge Valve

In some embodiments, fluid treatment systems may further comprise a discharge valve. A discharge valve may be disposed on a discharge stream. A discharge valve may be configured to control flow of a fluid from a recycle stream through a discharge stream. In some embodiments, a discharge valve may stop and/or start flow of a contaminated fluid therethrough. Various types of valves may be used without departing from the description herein. In some embodiments, a discharge valve may be a ball valve, butterfly valve, plug valve, needle valve, pinch valve, gate valve, annular valve, diaphragm valve, or other suitable valve.

Additional Components

In some embodiments, additional articles such as pumps or valves may be used without departing from the description herein. For example, in some embodiments, additional pumps such as centrifugal pumps, horizontal pumps, screw pumps, and other pumps may be added as part of a fluid treatment system to regulate flow of various fluid streams therein. As another example, in some embodiments, additional valves such as ball valves, butterfly valves, plug valves, needle valves, pinch valves, gate valves, annular valves, diaphragm valves, or other suitable valves may be added as part of a fluid treatment system to control or regulate flow of various fluid streams therein.

pH Control

In some embodiments, fluid treatment systems of the present disclosure may advantageously control pH fluctuation of a contaminated fluid during treatment of hardness reduction and contaminant removal. In some fluid treatment systems, precipitation of calcium and magnesium into calcium carbonate and magnesium carbonate may increase a pH level of the resulting fluid stream. In some systems, a pH level may raise as high as or above 10. For some purposes, an increase in pH level may be undesirable.

In some fluid treatment systems, pH neutralization agents may be added or may be necessary to reduce or control the increase in a pH level of a fluid. In some embodiments of the present disclosure, a configuration of an aeration unit, chemical inlet, and concentrate tank may control a pH level such that post-neutralization agents may not be necessary for a fluid treatment process or system thereof. An aeration unit may be operable to strip $CO_2$ from a feed stream before hardness reduction takes place. As a result, in some embodiments, essentially all of the lime and/or soluble hydroxide ions added upstream may react directly with the hardness. Only near stoichiometric addition of hydroxide chemical may be required in some embodiments. Hydroxide chemicals are not required to raise the above pH 10 because precipitation reactions occur in the concentrate tank, where there are high concentrations of $CaCO_3$ and/or $MgCO_3$. The $CaCO_3$ and/or $MgCO_3$ in the concentrate tank promote dissolved Ca and Mg precipitation at pH levels below 9. Accordingly, the pH of the treated water may be less than 9 in some embodiments.

In some embodiments of the present disclosure, fluid treatment systems and methods thereof may advantageously reduce the need for post-neutralization agents and thereby advantageously reduce chemical footprint and chemical requirements. In some embodiments of the present disclosure, treated fluids may have a pH of about 9 or less.

Enhanced Mass Transfer

In some embodiments, fluid treatment systems may employ cross-flow filtration or may exhibit cross-flow mechanics. In cross-flow filtration, an incoming feed stream may pass across the surface of a cross-flow membrane. In some cross-flow filtration systems, two exiting streams may be generated. A permeate stream may be a portion of a fluid that passes through a membrane. A permeate stream may contain some portion of soluble and/or insoluble components from a feed stream or contaminated fluid. Components in a permeate stream may be smaller than a removal rating or a pore size of a membrane. A retentate stream may be remainder of a feed stream or contaminated fluid that did not pass through a membrane.

In some embodiments, cross-flow filtration and cross-flow mechanics may improve mass transfer and promote mixing of a fluid. Enhanced mass transfer may promote component contact wherein greater contact between different components occur. Component contact may lead to desired reactions. Thus, enhanced mass may allow for faster reaction rates, such as faster precipitation rates for hardness reduction.

In some embodiments, cross-flow filtration as employed by fluid treatment systems may advantageously create a sink-like effect. Solids present in the contaminated fluid entering a concentrate tank may act as a sink and draw contaminants to them as they enter the concentrate tank. The sink-like effect may synergistically promote greater hardness reduction and contaminant removal.

Honing Material

In some fluid treatment systems, honing materials may be added to a fluid. Honing materials may advantageously scrub foulants from filtration membranes. Thus, fluid treatment systems may add honing materials to prevent fouling of filtration membranes.

In some embodiments of the present disclosure, precipitated calcium carbonates, magnesium carbonates, or other metal precipitates may demonstrate the same effect as honing materials. In some embodiments, precipitated calcium carbonates or magnesium carbonates may serve to scrub foulants from filtration membranes. Accordingly, in some embodiments, a separate honing material may not need to be added to a fluid treatment system. The ability of precipitated calcium carbonates or magnesium carbonates to act as honing materials may advantageously reduce membrane cleaning requirements such as the need for separate honing materials. The ability of precipitated calcium carbonates or magnesium carbonates to act as honing materials may also advantageously reduce operating costs.

Small Size/Miniaturization

In some embodiments of the present disclosure, fluid treatment systems may be substantially more compact or space efficient than traditional hardness removal systems. In some embodiments, concentrate tanks of fluid treatment systems may comprise volumes of about 800 gallons. In some embodiments, concentrate tanks of fluid treatment systems may comprise diameters of about 6 feet. In some embodiments, more compact and space efficient fluid treatment systems may also be more cost efficient.

In some embodiments, fluid treatment systems of the present disclosure may obviate a precipitation reactor, or a separate filtration tank or filtration system.

In some embodiments, fluid treatment systems of the present disclosure may reduce chemical footprint and chemical requirements. In some embodiments, increased mass transfer in fluid treatment systems of the present disclosure may allow for shorter processing or retention times.

Methods of Use

According to some embodiments, the present disclosure relates to methods of treating fluids or methods of operating fluid treatment systems. More specifically, in some embodiments, the present disclosure relates to methods for hardness reduction and contamination removal of a fluid.

In some embodiments, methods of fluid treatment may comprise providing a feed stream comprising a contaminated fluid to a concentrate tank. Methods may further comprise receiving a contaminated fluid in a concentrate tank. Methods may further comprise reducing a hardness of a contaminated fluid in a concentrate tank. A concentrate tank according to the embodiments of disclosed methods may be configured to reduce the hardness of contaminated fluids. In some embodiments, reducing hardness of contaminated fluids may comprise precipitating metals from contaminated fluids. Metals precipitated from contaminated fluids may comprise calcium, magnesium, and other metals that may be oxidized.

A method of fluid treatment may comprise (e.g., further comprise) transferring a concentrated fluid from a concentrate tank to a filtration unit. A method of fluid treatment may comprise (e.g., further comprise) receiving at a filtration unit a concentrated fluid from a concentrate tank. A filtration unit according to embodiments of the disclosed methods may be configured to filter contaminants from a concentrated fluid. In some embodiments, a filtration unit may be a ceramic membrane system or ceramic membrane filtration unit. Methods may further comprise transferring a treated fluid from the filtration unit. A treated fluid may be received at an exit stream from a filtration unit.

In some embodiments, aeration units may be disposed upstream of a concentrate tank. Aeration units may comprise a DO addition device. Compressed air inlets or compressed gas inlets may be coupled to DO addition devices. In some embodiments, methods according to the present disclosure may further comprise receiving at or through DO addition devices compressed air from compressed air inlets. In some embodiments, methods may further comprise removing $CO_2$ content from contaminated fluids using aeration units.

In some embodiments, a compressed gas inlet or compressed air inlet may be connected to a permeate side of a DO addition device. A DO addition device may comprise a substrate, wherein the substrate may comprise pores of particular diameters. Substrate pores may have diameters of less than 1 micron. A compressed gas provided by a compressed gas inlet may be passed through a substrate. Compressed gas passed through a substrate may form sub-micron sized bubbles on a wet side of the substrate. Generated bubbles may be small enough such that their buoyancy does not allow the bubbles to overcome a surface tension of the substrate. Thus, generated bubbles may remain adhered to a side of the substrate and may not rise to the top of the contaminated fluid. Generated sub-micron sized bubbles may then be scrubbed at a flow rate of about 4 l/min.

In some embodiments, methods may further comprise providing a chemical inlet upstream of a concentrate tank. At least one coagulant and/or base may be provided to a contaminated fluid through a chemical inlet. A coagulant may be selected from the group consisting of alum (aluminum sulfate), ferric chloride or ferric sulfate, polyaluminum chloride (PAC) and aluminochloro hydrate (ACH), and combinations thereof. Other coagulants may be chosen depending on contents or characteristics of a contaminated fluid. A coagulant introduced into a contaminated fluid may promote coagulation of contaminants in a contaminated fluid.

In some embodiments, methods may further comprise providing a pump between a concentrate tank and a filtration unit. A pump provided therebetween may be operate to regulate a flow of a concentrated fluid from a concentrate tank to a filtration unit.

In some embodiments, methods may further comprise providing a recycle stream. Methods may comprise receiving in a recycle stream a recycle fluid from a filtration unit. Methods may comprise providing a recycle fluid in a recycle stream to a concentrate tank.

In some embodiments, methods may further comprise providing and/or operating a recycle valve on a recycle stream. A recycle valve may be operable to regulate a flow of a recycle fluid from a filtration unit to a concentrate tank using a recycle valve. In some embodiments, methods may further comprise providing a discharge stream on a recycle stream. At least a portion of a recycle fluid may be discharged through a discharge stream. In some embodiments, methods may further comprise providing a discharge valve on a discharge stream. A discharge valve may be operable to regulate a flow of a discharge stream.

Specific Example Embodiments

A specific example embodiment of a fluid treatment system is illustrated in FIG. 1. FIG. 1 illustrates a fluid treatment system 100 that may be operable to treat a contaminated fluid 101. More specifically, fluid treatment system 100 may be configured for hardness reduction and contaminant removal. As seen in FIG. 1, fluid treatment system 100 may comprise a feed stream 103. Feed stream 103 may be operable to provide contaminated fluid 101 therein.

Feed stream 103 may be in fluid communication with aeration unit 105. Aeration unit 105 may be operable to remove $CO_2$ content from a contaminated fluid. In some embodiments, aeration unit 105 may be a DO addition device. In some embodiments, aeration unit 105 may be coupled to or otherwise connected to compressed gas inlet 107. Compressed gas inlet 107 may be operable to provide a compressed gas or a compressed air stream into aeration unit 105 or a DO addition device. Aeration unit 105 may comprise a substrate therein (not pictured). A compressed gas inlet may be coupled to or otherwise connected to an aeration unit 105 on a permeate side of aeration unit 105.

In some embodiments, chemical inlet 109 may be disposed downstream of aeration unit 105. Chemical inlet 109 may be coupled to or in fluid communication with an output fluid stream of aeration unit 105. Chemical inlet 109 may be configured to provide at least one coagulant, base, or other material to contaminated fluid 101. At least one base may be selected from a group consisting of calcium hydroxide, sodium hydroxide, and potassium hydroxide. A coagulant may be selected from alum (aluminum sulfate), ferric chloride or ferric sulfate, polyaluminum chloride (PAC) and aluminochloro hydrate (ACH), and combinations thereof.

Concentrate reactor 110 may be disposed downstream of aeration unit 105 and downstream of chemical inlet 109. Concentrate reactor 110 may be operable to receive contaminated fluid 101. Concentrate reactor 110 may be operable to reduce hardness of contaminated fluid 101. Concentrate reactor 110 may comprise an 800 gal/tank and may comprise a 6 ft diameter. Concentrate reactor 110 may have a retention rate of about 1 minute.

Concentrate reactor 110 may be in fluid communication with filtration unit 120. Pump 116 may be provided therebetween. Pump 116 may be configured to drive and/or regulate flow of concentrated fluid 113 from concentrate reactor 110 to filtration unit 120.

In some embodiments, filtration unit 120 may be provided downstream of concentrate reactor 110 and may be provided downstream of pump 116. Filtration unit 120 may be operable to filter contaminants from concentrated fluid 113. In some embodiments, filtration unit 120 may be a ceramic membrane system.

In some embodiments, exit stream 121 may be coupled to or otherwise connected to filtration unit 120. Exit stream 121 may comprise treated fluid 123 from filtration unit 120.

Fluid treatment system 100 may recycle fluid 125 from filtration unit 120 back to concentrate reactor 110 in some embodiments. Recycle fluid 125 may be recycled via a recycle stream 127. Recycle stream 127 may be configured to receive recycle fluid 125 from filtration unit 120 and to provide recycle fluid 125 to concentrate reactor 110. In some embodiments, recycle valve 142 may be disposed on recycle stream 127 and may be configured to control flow of recycle fluid 125 from filtration unit 120 to concentrate reactor 110.

In some embodiments, a fluid treatment system 100 may comprise discharge stream 131 disposed on recycle stream 127. Discharge stream 131 may be configured to discharge at least a portion of recycle fluid 125 from recycle stream 127. Discharge valve 130 may be disposed on discharge stream 131 and may be configured to control flow of discharge stream 131.

Figure 2:
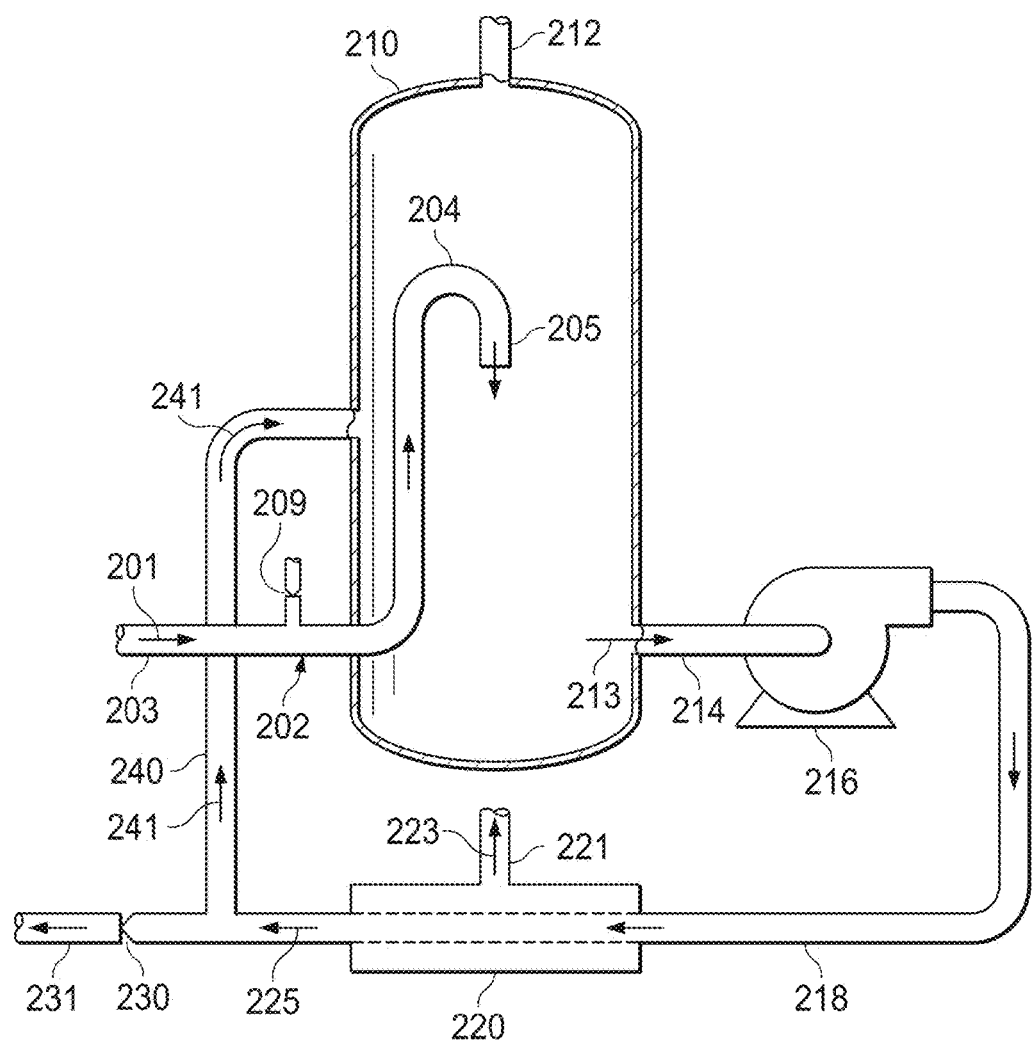
FIG. 2 illustrates a fluid treatment system according to a specific example embodiment of the disclosure.

A specific example embodiment of a fluid treatment system is illustrated in FIG. 2. FIG. 2 illustrates a fluid treatment system 200 that may be operable to treat a contaminated fluid 201. System 200 comprises inlet 202, high solids contact reactor 210, pump 216, filtration unit 220, exit stream 222, and recycle stream 240. Fluid treatment system 200 may be configured for contaminant removal. As seen in FIG. 2, fluid treatment system 200 may comprise a feed stream 203. A feed stream 203 may house a contaminated fluid 201 therein.

Concentrate reactor 210 may be disposed downstream of chemical inlet 209 in some embodiments. Concentrate reactor 210 may comprise aperture 212, which may be open to the atmosphere. Concentrate reactor 210 may be operable to receive contaminated fluid 201. Concentrate reactor 210 may be operable to reduce hardness of contaminated fluid 201. In some embodiments, concentrate reactor 210 may comprise an ~100 gal/tank and may comprise a 6 ft diameter. Concentrate reactor 210 may have a retention rate of about 1 minute.

In some embodiments, concentrate reactor 210 may be in fluid communication with filtration unit 220. Pump 216 may be provided therebetween. Pump 216 may be configured to drive and/or regulate flow of concentrated fluid 213 from concentrate reactor 210 to filtration unit 220. Filtration unit 220 may be provided, in some embodiments, downstream of concentrate reactor 210 and may be provided downstream of pump 216. Filtration unit 220 may be operable to filter contaminants from concentrated fluid 213. In some embodiments, filtration unit 220 may be a ceramic membrane system. Exit stream 221 may be coupled to or otherwise connected to filtration unit 220. Exit stream 221 may comprise treated fluid 223 from filtration unit 220.

Fluid treatment system 200 may recycle, according to some embodiments, fluid 225 from filtration unit 220 back to concentrate reactor 210. Recycle fluid 225 may be recycled via a recycle stream 240. Recycle stream 240 may be configured to receive recycle fluid 225 from filtration unit 220 and to provide recycle fluid 225 to concentrate reactor 210. In some embodiments, a recycle valve may be disposed on recycle stream 240 and may be configured to control flow of recycle fluid 225 from filtration unit 220 to concentrate reactor 210.

In some embodiments, a fluid treatment system 100 may comprise discharge stream 231 disposed on recycle stream 240. Discharge stream 231 may be configured to discharge at least a portion of recycle fluid 225 from recycle stream 240. For example, discharge stream 231 may be configured to blowdown the recycle loop intermittently or continuously to remove accumulated solids. Discharge valve 230 may be disposed on discharge stream 231 and may be configured to control flow of discharge stream 231. Recycle fluid 241 (recycle fluid 225 following discharge at valve 230) continues on to reactor 210.

Tank 210 may be oriented in a vertical position. Inlet stream 202 may traverse the wall of tank 210, ascend at least partially within tank 210, turn through U-turn 204, and terminate at inlet 205. Depositing contaminated media in tank 210 at a relatively high position (e.g., above the midpoint of vertically oriented tank 210) and/or distant (e.g., opposite) from media outlet 214 may desirably aid mixing and/or purification. Filtration unit 220 may be positioned as desired relative to tank 210. For example, filtration unit 220 may be positioned in generally the same horizontal plane as pump 216, and/or tank outlet 214. Recycle stream 240 may also desirably empty into tank at a relatively high position (e.g., above the midpoint of vertically oriented tank 210) and/or distant (e.g., opposite) from media outlet 214. Media outlet 214 may be desirably positioned relatively low in tank 210 (e.g., at the bottom, near the bottom, below the midpoint).

A specific example embodiment of a fluid treatment system is illustrated in FIG. 3. FIG. 3 illustrates a fluid treatment system 300 that may be operable to treat a contaminated fluid. System 300 comprises inlet 302, high solids contact reactor 310, pump 316, filtration unit 320, exit (permeate) stream 322, and recycle stream 340. Fluid treatment system 300 may be configured for contaminant removal. As seen in FIG. 3, fluid treatment system 300 may comprise a feed stream 303. A feed stream 303 may house a contaminated fluid 301 therein. System 300 may further comprise skid 370 to which other components of system 300 may be fixed. System 300 may further comprise controller 380 and/or flow regulators, flow meters, release valves, flanges, and other components as shown.

Sample Data

Table 1 illustrates sample results of fluid treatment according to certain embodiments of the present disclosure. Data for five illustrative samples are seen in Table 1.

TABLE 1

| Parameter | Inlet | Outlet | Inlet | Outlet | Inlet | Outlet | Inlet | Outlet | Inlet | Outlet |
|---|---|---|---|---|---|---|---|---|---|---|
| pH | 8.04 | 8.34 | 7.71 | 8.22 | 7.51 | 8.46 | 7.86 | 9.58 | 7.14 | 9.59 |
| Temp. [° C.] | 22.3 | 22.7 | 22 | 21.7 | 19.8 | 19.9 | 20.8 | 20.9 | 16.6 | 16.5 |
| UVT (%) | 83.7 | 86.9 | 83.7 | 86.4 | 89 | 87.9 | 88.5 | 88.1 | 88.3 |
| Color [TCU] | <3 | <3 | 3 | 3 | 5 | 3 | 3 | <3 | 3 | 3 |
| TDS [mg/L] | 520 | 437 | 489 | 469 | 469 | 383 | 523 | 489 | 446 | 474 |
| Organic $N_2$ [mg/L] | 0.13 | 0.22 | <0.05 | 0.15 | 0.41 | 0.29 | 0.25 | 0.26 | 0.13 | 0.16 |
| TKN [mg/L] | 0.26 | 0.25 | <0.5 | <0.5 | 0.41 | 0.32 | <0.5 | <0.5 | 0.17 | 0.24 |
| $NH_3 + NH_4$ (N) [mg/L] | 0.13 | <0.04 | 0.16 | 0.08 | <0.04 | <0.04 | 0.04 | <0.04 | 0.04 | 0.08 |
| Unionized $NH_3$ [mg/L N] | 0.006 | <0.005 | <0.005 | 0.006 | 0.005 | 0.005 | <0.005 | 0.012 | <0.005 | 0.044 |
| Hardness [mg/L as $CaCO_3$] | 348 | 157 | 366 | 206 | 360 | 137 | 357 | 85.4 | 386 | 88.2 |
| Total Fe [ug/L] | <3 | <3 | <3 | <3 | <3 | <3 | 17 | 6 | <3 | <3 |
| Fe (dissolved) [ug/L] | <3 | <3 | <3 | <3 | <3 | <3 | <3 | <3 | <3 | <3 |
| Total Mn [ug/L] | 93.3 | 4.4 | 94.3 | 7 | 54.3 | 1.6 | 59.1 | 0.8 | 68.3 | 0.9 |
| Mn (dissolved) [ug/L] | 82.6 | 4.2 | 69.5 | 6.1 | 50.8 | 1.8 | 39.4 | 0.8 | 54.3 | 1 |

As will be understood by those skilled in the art who have the benefit of the instant disclosure, other equivalent or alternative compositions, devices, methods, and systems for fluid treatment systems can be envisioned without departing from the description contained herein. Accordingly, the manner of carrying out the disclosure as shown and described is to be construed as illustrative only.

Persons skilled in the art may make various changes in the shape, size, number, and/or arrangement of parts without departing from the scope of the instant disclosure. For example, the position and number of valves or pumps may be varied. In addition, the size of a device and/or system may be scaled up (e.g., to be used for larger fluid treatment systems) or down (e.g., to be used for miniaturized fluid treatment systems) to suit the needs and/or desires of a practitioner. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value +/−about 10%, depicted value +/−about 50%, depicted value +/−about 100%) and/or a range endpoint. With respect to the former, a value of 50 depicted in an example, table, and/or drawing may form the basis of a range of, for example, about 45 to about 55, about 25 to about 100, and/or about 0 to about 100.

All or a portion of a device and/or system for fluid treatment systems may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

What is claimed is:

1. A system for treating a contaminated fluid to generate a treated fluid having at least one of a reduced metal content and a reduced hardness, the system comprising:
    a feed stream configured to provide the contaminated fluid;
    an aeration unit in fluid communication with the feed stream such that the feed stream passes the aeration unit and receives from the aeration unit at least one of a micron sized bubble and a sub-micron sized bubble to generate an aerated feed stream,
    wherein the aeration unit is operable to remove CO2 content from the contaminated fluid;
    a high solids contact reactor configured to directly receive the aerated feed stream and is operable to permit formation of a concentrated fluid comprising one or more contaminant solids;
    and
    a ceramic membrane filtration unit configured to receive a concentrated fluid from the high solids contact reactor,
    wherein the ceramic membrane filtration unit is operable to filter the concentrated fluid to generate the treated fluid having the at least one of the reduced metal content and the reduced hardness.

2. A system according to claim 1, wherein the high solids contact reactor is further operable to precipitate one or more metals from the aerated feed stream.

3. A system according to claim 2, wherein the one or more metals comprise calcium and magnesium.

4. A system according to claim 1, wherein the aeration unit comprises a dissolved oxygen addition device, and wherein the dissolved oxygen addition device is operable to receive compressed air from a compressed air inlet.

5. A system according to claim 4, wherein the compressed air inlet is connected via a cavity in the dissolved oxygen addition device to the dissolved oxygen addition device.

6. A system according to claim 4, wherein a dissolved oxygen addition device comprises a substrate having pores less than 1 micron in diameter.

7. A system according to claim 1, further comprising a chemical inlet upstream of the high solids contact reactor, wherein the chemical inlet is configured to provide a coagulant to and the aerated feed stream, and wherein the coagulant promotes coagulation of one or more contaminants.

8. A system according to claim 7, wherein the coagulant is selected from the group consisting of alum (aluminum sulfate), ferric chloride or ferric sulfate, polyaluminum chloride (PAC) and aluminochloro hydrate (ACH), and combinations thereof.

9. A system according to claim 1 further comprising a pump disposed between the high solids contact reactor and the ceramic membrane filtration unit, wherein the pump is configured to regulate flow of the concentrated fluid from the high solids contact reactor to the ceramic membrane filtration unit.

10. A system according to claim 1 further comprising a recycle stream configured to receive a recycle concentrated fluid from the ceramic membrane filtration unit and to provide the recycle concentrated fluid to the high solids contact reactor.

11. A system according to claim 10 further comprising a recycle valve disposed on the recycle stream, wherein the recycle valve is configured to control flow of the recycle concentrated fluid from the ceramic membrane filtration unit to the high solids contact reactor.

12. A system according to claim 10 further comprising a discharge stream disposed on the recycle stream, wherein the discharge stream is configured to discharge at least a portion of the recycle concentrated fluid from the recycle stream.

13. A system according to claim 12 further comprising a discharge valve disposed on the discharge stream, wherein the discharge valve is configured to control flow of the discharge stream.

14. A system according to claim 10, wherein the high solids contact comprises a high solids contact reactor outlet pipe.

15. A system according to claim 14, wherein the high solids contact reactor further comprises a recycle concentrated fluid inlet pipe, and wherein the recycle concentrated fluid inlet pipe is positioned higher in the high solids contact reactor than the high solids contact reactor outlet pipe.

16. A system according to claim 10, wherein the high solids contact reactor comprises a high solids contact reactor outlet and a recycle fluid inlet pipe positioned higher in the high solids contact reactor than the high solids contact reactor outlet, and wherein at least a portion of a feed stream inlet pipe is inside the high solids contact reactor and wherein the portion of the feed stream inlet pipe inside the high solids contact reactor comprises a high solids contact reactor inlet and a U-turn proximal to the high solids contact reactor inlet.

17. A system according to claim 1, wherein the high solids contact reactor comprises a 100 gal/tank.

18. A system according to claim 1, wherein the high solids contact reactor comprises a 6 ft diameter.

19. A system according to claim 1, wherein the high solids contact reactor comprises a retention rate of about 1 minute.

20. A system according to claim 1, wherein at least a portion of a feed stream inlet pipe is inside the high solids contact reactor and wherein the portion of the feed stream inlet pipe inside the high solids contact reactor comprises a high solids contact reactor inlet and a U-turn proximal to the high solids contact reactor inlet.

21. A method for treating a feed stream comprising a contaminated fluid, the method comprising:
passing the feed stream through an aeration unit to generate an aerated feed stream,
wherein the aeration device is in fluid communication with the feed stream,
wherein the feed stream receives from the aeration unit at least one of a micron sized bubble and a sub-micron sized bubble, and
wherein the aeration unit is operable to remove $CO_2$ content from the feed stream;
depositing the aerated feed stream in a high solids contact reactor;
precipitating the aerated feed stream directly in the high solids content reactor to generate a concentrated stream; and
filtering the concentrated stream in a ceramic membrane filtration unit to generate a treated fluid having at least one of at least on of a reduced hardness and a reduced metal content.

22. A method according to claim 21,
wherein the aeration unit comprises a dissolved oxygen addition device,
wherein the dissolved oxygen addition device is operable to receive a compressed air from a compressed air inlet, and wherein the method further comprises connecting the compressed air from the compressed air inlet to the dissolved oxygen addition device.

23. A method according to claim 22, wherein the dissolved oxygen addition device comprises a substrate having pores less than 1 micron in diameter.

24. A method according to claim 23 further comprising:
passing the compressed air through the substrate;
forming sub-micron sized bubbles on a wet side of the substrate; and
scrubbing the sub-micron sized bubbles at a flow rate of about 4 L/min.

25. A method according to claim 21, wherein precipitating the aerated feed stream comprises precipitating one or more metals from the aerated feed stream.

26. A method according to claim 25, wherein the one or more metals comprise calcium and magnesium.

27. A method according to claim 21 further comprising retaining the aerated feed stream within the high solids contact reactor for about 1 minute.

28. A method according to claim 21 further comprising depositing a coagulant the aerated feed stream using a chemical inlet upstream of the high solids contact reactor.

29. A method according to claim 28, wherein the coagulant may be selected from the group consisting of alum (aluminum sulfate), ferric chloride or ferric sulfate, polyaluminum chloride (PAC) and aluminochloro hydrate (ACH), and combinations thereof.

30. A method according to claim 21 further comprising:
regulating a flow of the concentrated feed stream from the high solids contact reactor to the ceramic membrane filtration unit using a pump positioned between the high solids contact reactor and the ceramic membrane filtration unit.

31. A method according to claim 21 further comprising depositing a recycle concentrated fluid from a recycle concentrated stream pipe exiting the ceramic membrane filtration unit into a recycle concentrated fluid inlet pipe of the high solids contact reactor.

32. A method according to claim 31 further comprising regulating a flow of the recycle concentrated fluid from the ceramic membrane filtration unit into the recycle concentrated fluid inlet pipe of the high solids contact reactor using a recycle valve.

33. A method according to claim 31 further comprising discharging at least a portion of the recycle concentrated fluid from the recycle concentrated stream pipe as a discharge stream.

34. A method according to claim 33 further comprising adjusting a discharge valve to regulate a flow.

35. A system for treating a contaminated fluid to generate a treated fluid having at least one of a reduced metal content and a reduced hardness, the system comprising:
 a feed stream configured to provide the contaminated fluid;
 an aeration unit in fluid communication with the feed stream such that the feed stream passes the aeration unit and receives from the aeration unit at least one of a micron sized bubble and a sub-micron sized bubble to generate an aerated feed stream,
 wherein the aeration unit is operable to remove $CO_2$ content from the contaminated fluid,
 wherein the aeration unit comprises a dissolved oxygen addition device operable to receive compressed air from a compressed air inlet, wherein the dissolved oxygen addition device comprises a substrate having pores less than 1 micron in diameter;
 a chemical inlet configured to provide a coagulant to at least one of the feed stream and the aerated feed stream;
 a high solids contact reactor configured to directly receive the aerated feed stream and operable to permit formation of a concentrated fluid comprising one or more contaminant solids; and
 a ceramic membrane filtration unit configured to receive a concentrated fluid from the high solids contact reactor,
 wherein the ceramic membrane filtration unit is operable to filter the concentrated fluid to generate the treated fluid having the at least one of the reduced metal content and the reduced hardness.

* * * * *